(12) United States Patent
Reece

(10) Patent No.: US 6,179,133 B1
(45) Date of Patent: Jan. 30, 2001

(54) SEISMIC RACK WITH EXTENSION SUBASSEMBLY

(75) Inventor: Gil W. Reece, Wake Forest, NC (US)

(73) Assignee: Newton Instrument Company, Inc., Butner, NC (US)

(*) Notice: Under 35 U.S.C. 154(b), the term of this patent shall be extended for 0 days.

(21) Appl. No.: 09/385,144

(22) Filed: Aug. 30, 1999

(51) Int. Cl.[7] .................................................. A47F 5/00
(52) U.S. Cl. .......................... 211/26; 211/189; 211/190; 361/829
(58) Field of Search ..................... 211/26, 189, 175, 211/190; 312/265.1, 265.2, 265.3, 265.4, 265.5; 361/829

(56) References Cited

U.S. PATENT DOCUMENTS

| | | |
|---|---|---|
| 4,715,502 | 12/1987 | Salmon . |
| 5,008,779 | 4/1991 | Salmon . |
| 5,078,613 | 1/1992 | Salmon . |
| 5,246,378 | 9/1993 | Seiceanu . |
| 5,323,916 | 6/1994 | Salmon . |
| 5,422,946 * | 6/1995 | Delakowitz et al. ............. 361/829 X |
| 5,975,315 * | 11/1999 | Jordan ................................... 211/26 |
| 5,983,590 * | 11/1999 | Serban ............................... 211/26 X |

* cited by examiner

Primary Examiner—Robert W Gibson, Jr.
(74) Attorney, Agent, or Firm—Jenkins & Wilson, P.A.

(57) ABSTRACT

A rack assembly for mounting telecommunications equipment and adapted for withstanding seismic forces includes a main frame subassembly including an upper horizontal support member, a lower horizontal support member, a first vertical support member, and a second vertical support member spaced in parallel relation to the first vertical support member. The first and second vertical support members each have a double-bend profile, defined by an inside base portion, a first medial leg and a second medial leg each extending substantially orthogonally from the inside base portion, a first distal leg extending substantially orthogonally from the first medial leg in a direction towards the second medial leg, and a second distal leg extending substantially orthogonally from the second medial leg in a direction towards the first medial leg. An extension frame subassembly is securely attached to the upper horizontal support member of the main frame subassembly. The extension frame subassembly includes vertical frame members having the same double-bend profile as the first and second vertical support members of the main frame subassembly.

12 Claims, 7 Drawing Sheets

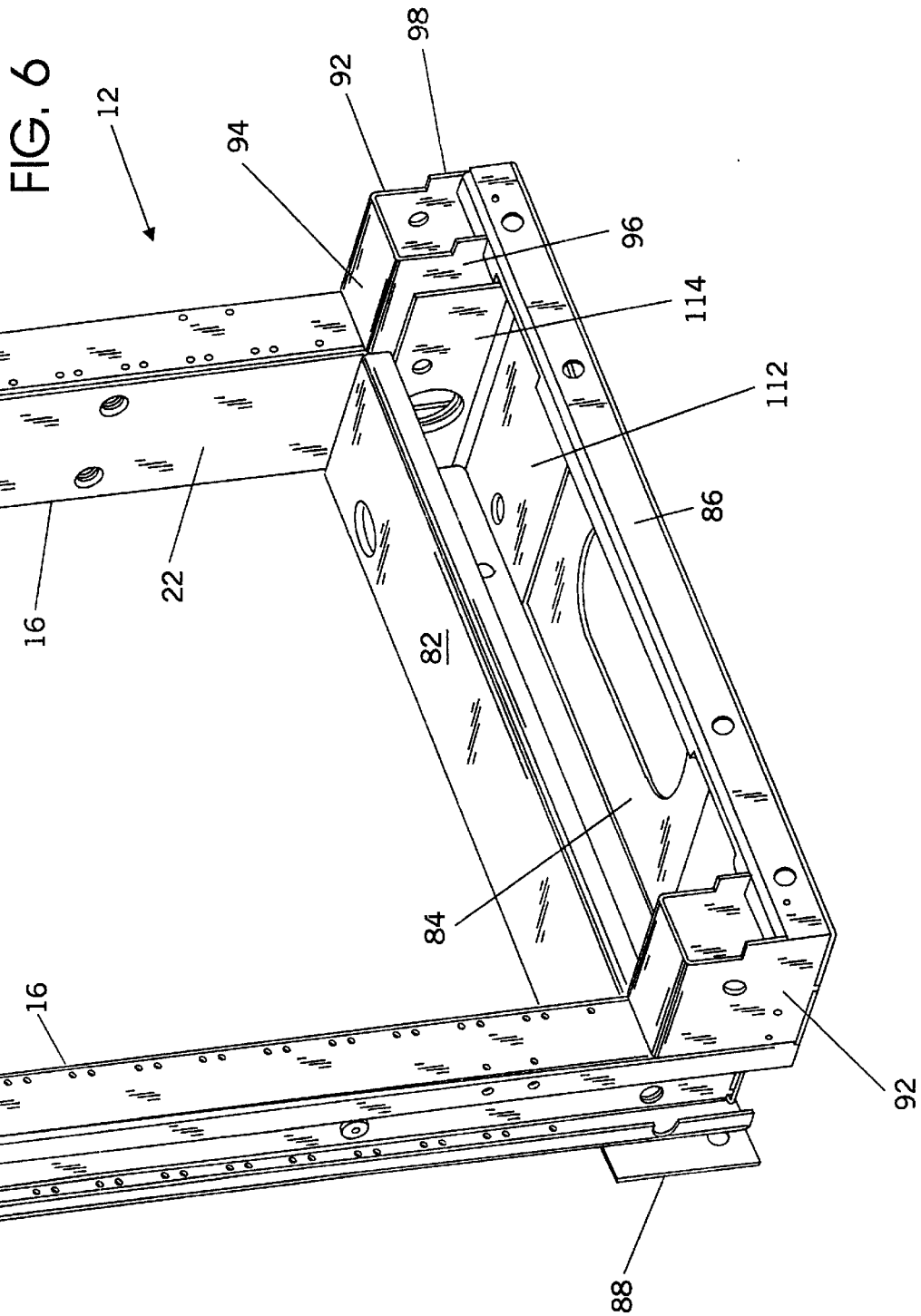

SEISMIC RACK WITH EXTENSION SUBASSEMBLY

TECHNICAL FIELD

The present invention relates to racks or bays used primarily for mounting and housing telecommunications equipment, and more specifically to racks and extension assemblies designed to protect equipment mounted in such racks from forces encountered during a seismic event.

BACKGROUND ART

Telecommunications equipment racks or bays are typically installed in controlled environment vaults, central switching offices, and remote switch buildings. Many conventional racks presently found in such facilities are large and cumbersome, because there has previously been a need to accommodate bulky and heavy equipment such as copper wiring and electromechanical switching components. The overall height of a conventional rack is typically 11.5 feet, which corresponds the ceiling height of rooms in which such racks are installed. To provide strength and stability, telecommunications racks are typically bolted to the floor and tied off the ceiling superstructure, and cables and wires are run from the superstructure directly through the tops of the racks.

Because of recent advances in the telecommunications industry, including the development and use of fiber optic transmission cable and small-scale, fully electronic components, the design of racks has been scaled down. As a result, the overall height required for racks has been reduced to 9 feet and most recently has been reduced to 7 feet. However, the ceiling heights of pre-existing facilities have not changed. New 7 foot racks may be installed next to old 9 foot or 11.5 foot racks. As a result, gaps are created between the tops of the 7 foot racks and the ceiling of the facility. This is undesirable in that wires or cables running down from the ceiling superstructure to the 7 foot racks are exposed and not protected by the racks, and the racks cannot be tied off to the ceiling superstructure with the use of conventional means. It is particularly undesirable in localities where the racks must adhere to rigid industry standards regarding the ability of telecommunications racks to withstand seismic forces. For example, racks of this type must be designed to meet the BELLCORE Zone 4 seismic test set forth in Document # GR-63-CORE.

Accordingly, there is a need for a telecommunications rack which can be adapted for installation in facilities with either 7, 9 or 11.5 foot ceilings. One way to accomplish this is to provide extension assemblies that are mountable to the top of a 7 foot rack. However, the rack with the extension assembly installed thereto must still meet industry seismic standards. In addition, the industry has recommended that users of such racks refrain from installing telecommunications equipment in the extended portions of the racks. This is because the extended portions themselves are not designed to safely protect telecommunications equipment from seismic forces. Unfortunately, in order to conserve space many users often ignore this recommendation and proceed to install sensitive equipment in the extended portions, thereby increasing the risk of severe damage to costly equipment. Therefore, there is a further need to provide an extension assembly that permits the rack to comply or remain in compliance with seismic standards while preventing the installation of equipment into the extension assembly itself. Applicant has designed a rack assembly which meets all of these requirements and which is described in detail hereinbelow.

DISCLOSURE OF THE INVENTION

In one embodiment according to the present invention, a rack assembly for mounting telecommunications equipment and adapted for withstanding seismic forces is provided. The rack assembly comprises a main frame subassembly including an upper horizontal support member, a lower horizontal support member, a first vertical support member, and a second vertical support member spaced in parallel relation to the first vertical support member. The upper and lower horizontal support members are securely interposed between the first and second vertical support members. The first and second vertical support members each have a double-bend profile, defined by an inside base portion, a first medial leg and a second medial leg each extending substantially orthogonally from the inside base portion, a first distal leg extending substantially orthogonally from the first medial leg in a direction towards the second medial leg, and a second distal leg extending substantially orthogonally from the second medial leg in a direction towards the first medial leg.

The rack assembly also comprises an extension frame subassembly. The extension frame subassembly includes an upper horizontal frame member, a lower horizontal frame member, a first vertical frame member, and a second vertical frame member spaced in parallel relation to the first vertical frame member. The upper and lower horizontal frame members are securely interposed between the first and second vertical frame members, and the lower horizontal frame member is securely attached to the upper horizontal support member of the main frame subassembly. The first and second vertical frame members each have the same double-bend profile as the first and second vertical support members of the main frame subassembly.

Preferably, the first and second vertical support members and the first and second vertical frame members are constructed of high-tensile, low-alloy steel having a minimum yield strength of 50,000 psi and a 26% or greater elongation.

In another embodiment, a rack assembly comprises a base subassembly including a lower base plate having a front edge, a rear edge, a first side edge, a second side edge. A first gusset has a first outer leg extending upwardly from the lower base plate proximate to the first side edge and a first inner leg extending upwardly from the lower base plate at a location spaced inwardly from the first side edge, and a second gusset has a second outer leg extending upwardly from the lower base plate proximate to the second side edge and a second inner leg extending upwardly from the lower base plate at a location spaced inwardly from the second side edge. The first and second gussets are disposed transversely with respect to the front and rear edges. A first vertical support member is mounted to the base subassembly adjacent to the first gusset and includes an inside base portion disposed in register with the first inner leg of the first gusset. A second vertical support member is mounted to the base subassembly adjacent to the second gusset and includes an inside base portion disposed in register with the second inner leg of the second gusset.

Angle inserts are provided in the base subassembly for stability. A first angle insert includes a horizontal portion disposed on the lower base plate of the base subassembly and a vertical portion disposed adjacent to and in contact with both the first inner leg of the first gusset and the inside base portion of the first vertical support member. A second angle insert includes a horizontal portion disposed on the lower base plate and a vertical portion disposed adjacent to and in contact with both the second inner leg of the second gusset and the inside base of the second vertical support member. Fasteners or other means are provided for removably attaching the first and second angle inserts to the base subassembly without the use of welding. An upper horizontal support member is securely interposed between the first and second vertical support members, wherein the base subassembly, the first and second vertical support members, and the upper horizontal support member cooperatively define a main frame subassembly.

An extension frame subassembly is also provided as part of the rack assembly. The extension frame subassembly includes an upper horizontal frame member, a lower horizontal frame member, a first vertical frame member, and a second vertical frame member spaced in parallel relation to the first vertical frame member. The upper and lower horizontal frame members are securely interposed between the first and second vertical frame members, and the lower horizontal frame member is securely attached to the upper horizontal support member of the main frame subassembly.

In another embodiment of the invention, the rack assembly comprises a main frame subassembly including an upper horizontal support member, a lower horizontal support member, a first vertical support member, and a second vertical support member spaced in parallel relation to the first vertical support member. The upper and lower horizontal support members are securely interposed between the first and second vertical support members, and the upper horizontal support member has two front corners, two rear corners, and a hole located proximate to each corner.

An extension frame subassembly is provided and includes an upper horizontal frame member, a lower horizontal frame member, a first vertical frame member, and a second vertical frame member spaced in parallel relation to the first vertical frame member, wherein the upper and lower horizontal frame members are securely interposed between the first and second vertical frame members. The lower horizontal frame member has two front corners, two rear corners, and a hole located proximate to each corner in alignment with a corresponding one of the holes of the upper horizontal support member of the main frame subassembly. Means are provided for securely attaching the lower horizontal frame member to the upper horizontal support member of the main frame subassembly including a bolt inserted through each corresponding pair of holes of the lower horizontal frame member and the upper horizontal support member and a nut threaded to each bolt.

In yet another embodiment of the present invention, an extension subassembly is adapted for installation to a main frame subassembly. The extension subassembly and main frame subassembly cooper actively define a rack assembly for mounting telecommunications equipment. The extension subassembly is adapted for adding strength to the rack assembly against seismic forces and for preventing the installation of telecommunication equipment within the extension subassembly. An open area within the extension subassembly is defined by the upper and lower horizontal frame members and the first and second vertical frame members. A filler panel is securely disposed within the open area and has an upper edge disposed proximate to the upper horizontal frame member, and lower edge disposed proximate to the lower horizontal frame member, a first side edge disposed proximate to the first vertical frame member, and a second side edge disposed proximate to the second vertical frame member.

It is therefore an object of the present invention to provide a seismic rack assembly for mounting telecommunications equipment that can be installed in facilities having either 7, 9 or 11.5 foot ceilings.

It is another object of the present invention to provide a seismic rack assembly for mounting telecommunications equipment that can be tied off directly to the superstructure of 7, 9 or 11.5 foot ceilings without exposing cables, wires and other equipment outside of the rack assembly.

It is another object of the present invention to provide a seismic rack assembly with an extension subassembly mounted to the top of such rack assembly, wherein the extension subassembly extends the overall height of the rack assembly in order to reach the ceiling of the facility in which the rack assembly is installed, and wherein the combination of the rack assembly and extension subassembly nevertheless meets industry standards for protecting telecommunications equipment from seismic forces.

It is a further object of the present invention to provide the aforesaid extension subassembly with structure that prevents the installation of telecommunications equipment directly in the extension subassembly, in accordance with the recommendations of the industry.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 6 is a perspective front view of a base subassembly according to the present invention.

DETAILED DESCRIPTION OF THE INVENTION

Figure 1:
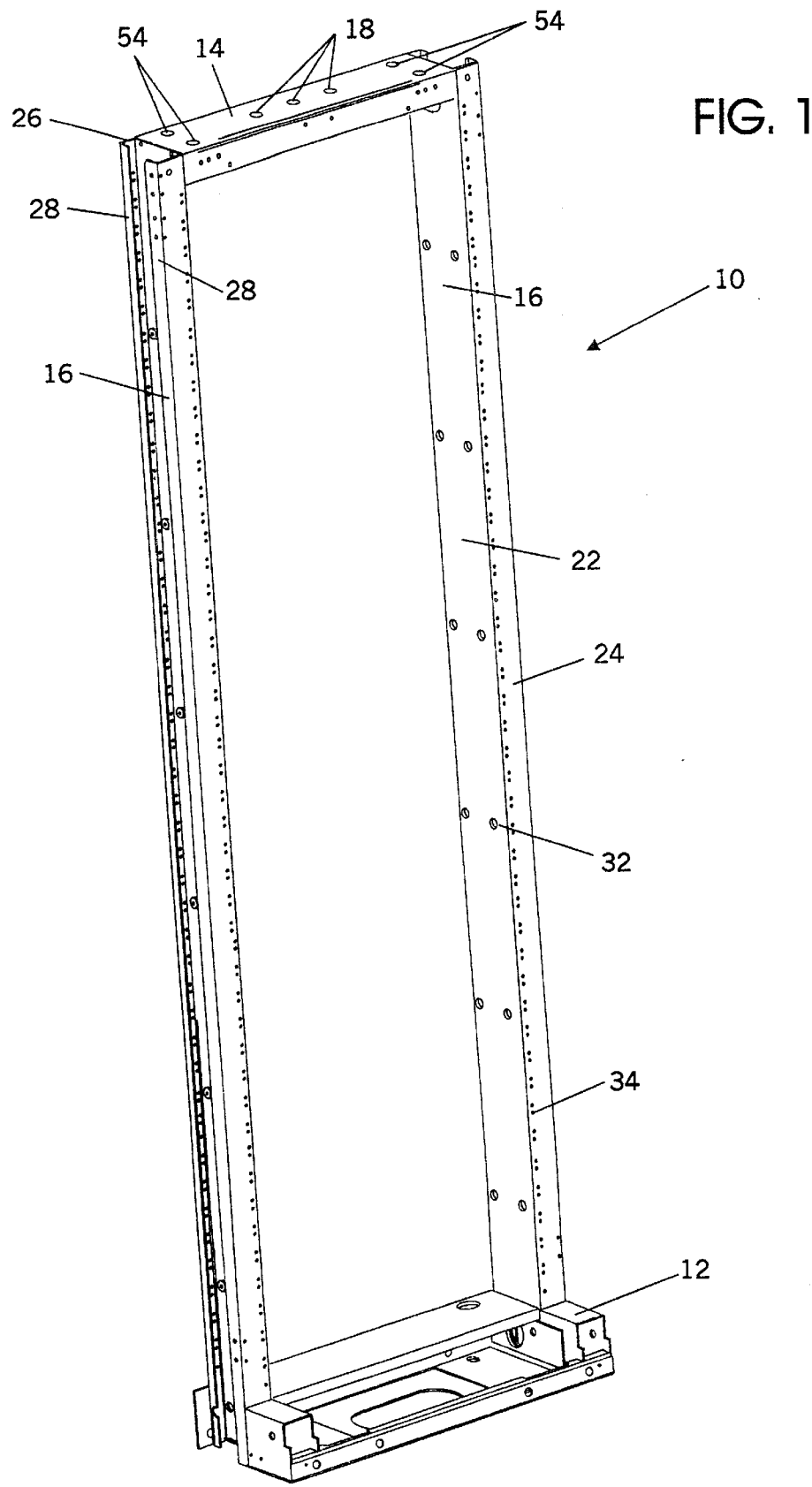
FIG. 1 is a perspective view of a main rack subassembly according to the present invention.

Referring now to the drawings, in FIG. 1 a main frame subassembly is provided and generally designated 10. Main frame subassembly 10 includes a lower horizontal support member or base subassembly 12, the details of which are described below, an upper horizontal support member 14, and two vertical support members 16. Vertical support members 16 are secured to upper horizontal support member 14 and base subassembly 12 by conventional means such as nuts and bolts extending through appropriately located holes. In one embodiment, the overall height of main frame subassembly 10 is 7 feet and the overall width is 25⅞ inches. Holes 18 in upper horizontal support member 14 may be used for running cables or wires therethrough or, in an application in which an extension frame is not needed, for access through which conventional means are employed for tying off main frame subassembly 10 to a 7 foot ceiling.

Vertical support members 16 each have a double-bend profile. That is, each vertical support member 16 includes an inside base portion 22 facing the interior of main frame subassembly 10, medial legs 24,26 extending outwardly from inside base portion 22, and distal legs 28 extending transversely towards each other from medial legs 24, 26. Preferably, inside base portion 22 is 5.06 inches deep, and one medial leg 24 of each vertical support member 16 is greater in length than the other medial leg 26. Vertical support members 16 additionally include holes 32 and 34 of various sizes and locations to which equipment may be mounted directly or to which shelving or individual racks may be mounted. The width between inside base portions 22 of vertical support members 16 is 21½ inches.

Figure 2:
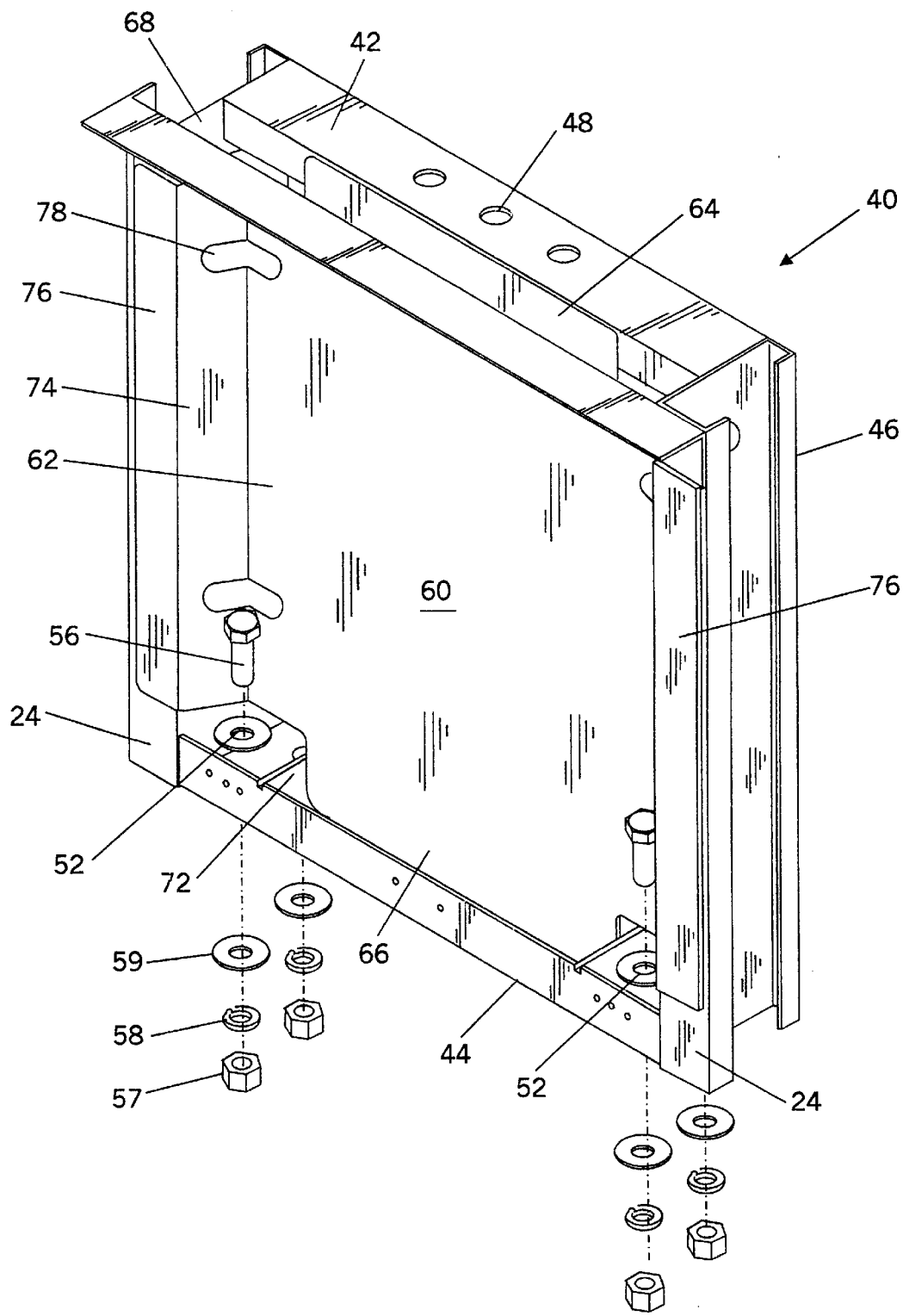
FIG. 2 is a perspective frontal view of an extension frame subassembly according to the present invention.
Figure 3:
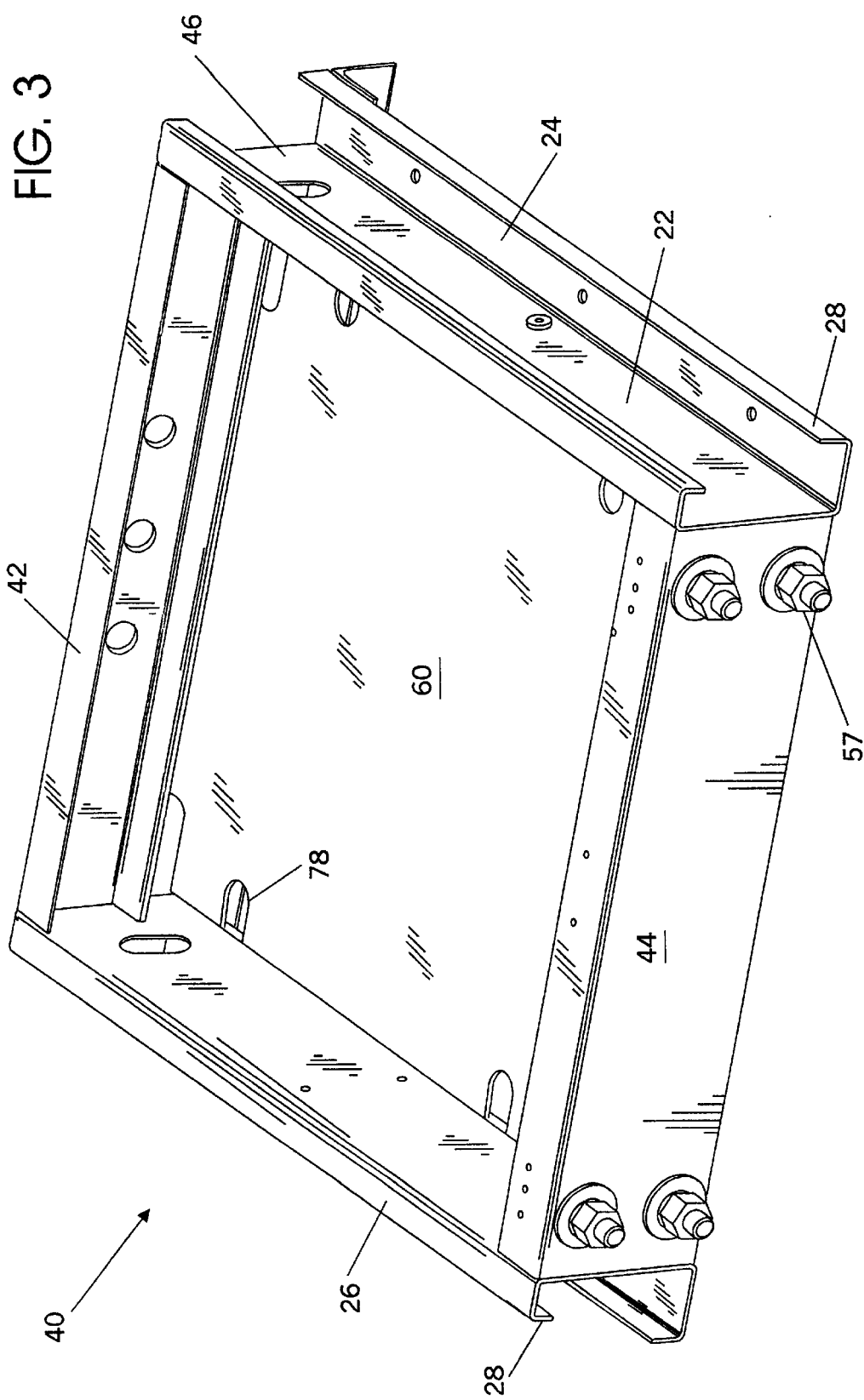
FIG. 3 is a perspective rear view of the extension frame subassembly of FIG. 2.
Figure 4:
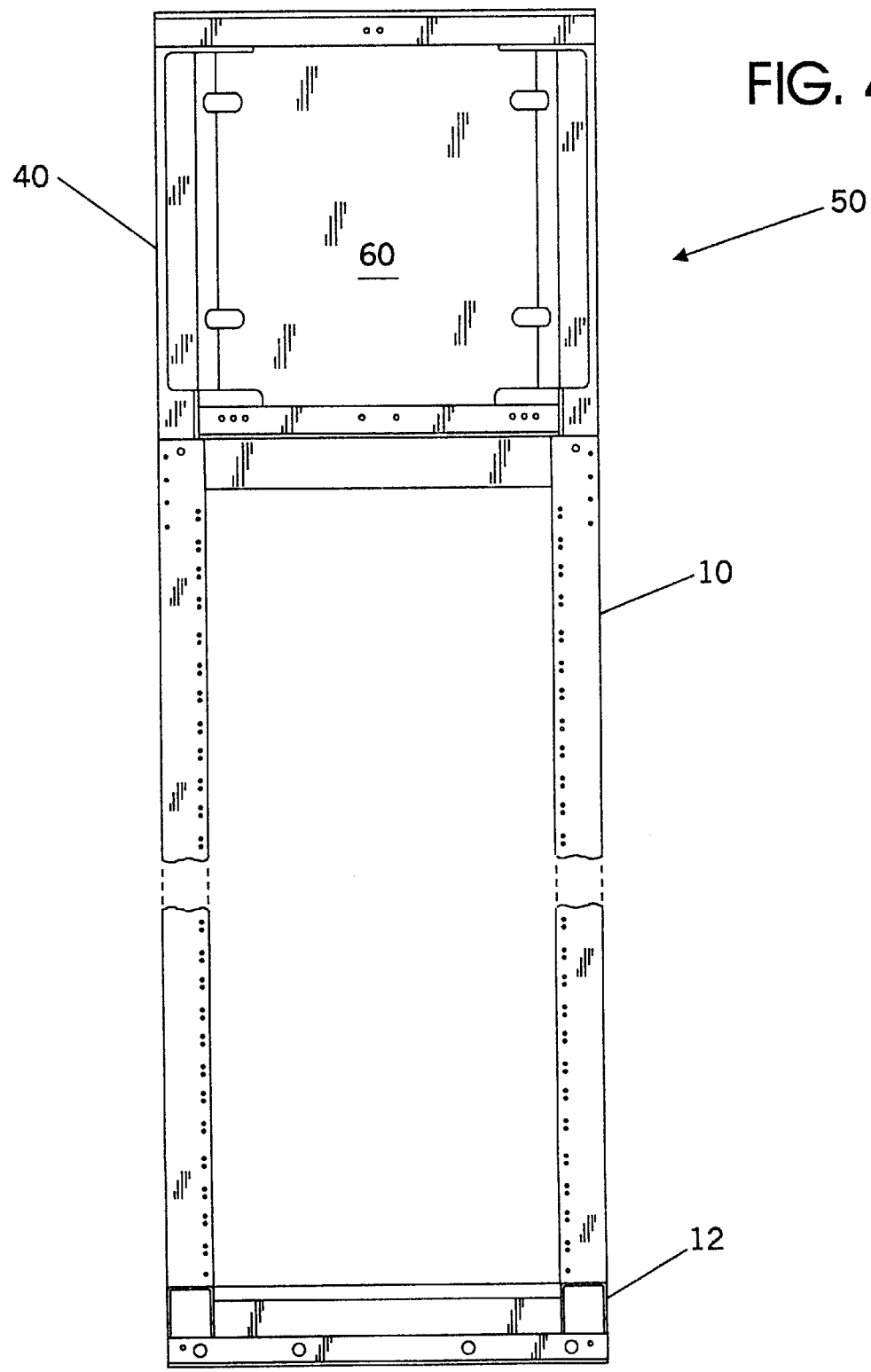
FIG. 4 is a front elevation view of a rack assembly according to the present invention.

In order to extend the height of main frame subassembly 10 as needed by the end user, an extension frame subassembly is provided and generally designated 40 in FIGS. 2 and 3. Extension frame subassembly 40 includes upper and lower horizontal frame members 42 and 44 and vertical frame members 46, all of which are secured to each other by conventional means. Upper horizontal frame member 42 may include a series of holes 48, similar to holes 18 of upper horizontal support member 14 of main frame subassembly 10, for running cables or wires therethrough from a ceiling superstructure and/or for tying off extension frame subassembly 40 to the ceiling superstructure. Extension frame subassembly 40 is securely mounted to the top of main frame subassembly 10 to form a rack assembly, generally designated 50 in FIG. 4. The height of extension frame subassembly 40 can be either 2 or 4.5 feet, depending upon whether an overall height of 9.0 or 11.5 feet for rack assembly 50 is required at the particular installation site.

Certain aspects of the present invention permit rack assembly 50, as constructed from main frame and extension subassemblies 10, 40, respectively to adequately protect equipment installed therein from the deleterious effects of seismic forces. Referring again to FIGS. 2 and 3, vertical frame members 46 are sized similarly to vertical support members 16 of main frame subassembly 10, and have the same double-bend profile as vertical support members 16. Vertical frame members 46 and vertical support members 16 are constructed of a steel having a minimum yield strength of 50,000 psi and an percent elongation of 26% or greater. ASTM #AS-715 steel may be specially ordered to obtain these properties. In this case, percent elongation is a measure of the ductility of the material, and is characterized by elongation and reduction in cross-sectional area during testing. Hence, percent elongation is defined as $(L_f-L_o)/L_o$, where $L_o$ is the original gage length of the test specimen and $L_f$ is the distance between the gage marks at fracture.

In addition, a spread-out 4-bolt pattern is used to secure extension frame subassembly 40 to main frame subassembly 10. Thus, holes 52 are provided (only two holes 52 are shown in FIG. 2) in lower horizontal frame member 44 proximate to the four corners thereof, and in alignment with corresponding holes 54 drilled into upper horizontal support member 14 of main frame subassembly 10 (see FIG. 1). Preferable fastening means include ⅝-11×11 ¾ inch bolts 56, ⅝-11 inch hex nuts 57, ⅝ inch lock washers 58, and ⅝ inch flat washers 59.

In order to provide additional stiffness to extension frame subassembly 40, and to prevent end users from installing equipment within the interior of extension frame subassembly 40 as opposed to within main frame subassembly 10, a filler panel 60 is preferably secured within extension frame subassembly 40. In the embodiment shown in FIGS. 2 and 3, filler panel 60 includes a central panel portion 62 and upper and lower tabs 64, 66, respectively. Upper and lower tabs 64, 66 are respectively disposed within slotted areas 68, 72 in upper and lower horizontal frame members 42, 44. Angled portions 74 extend forwardly from both sides of central panel portion 62, and side tabs 76 extend outwardly from angled portions 74. Side tabs 76 are disposed in registered contact with medial legs 24 of vertical frame members 46. Filler panel 60 can be secured to extension frame subassembly 40 by means of fasteners extended through holes (not shown) in upper, lower and side tabs 64, 66, 76, respectively, or through slots 78 on filler panel 60.

Figure 5A:
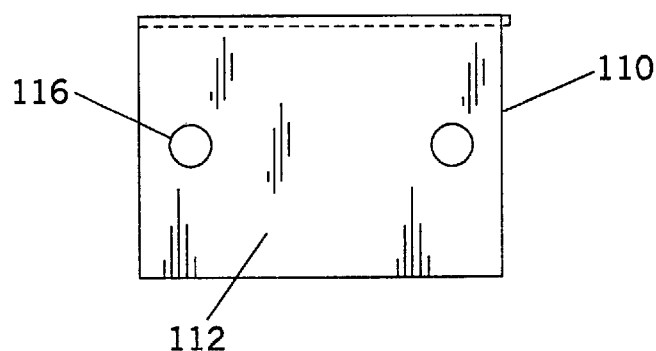
FIG. 5A is a bottom plan view of an angle insert according to the present invention.
Figure 5B:
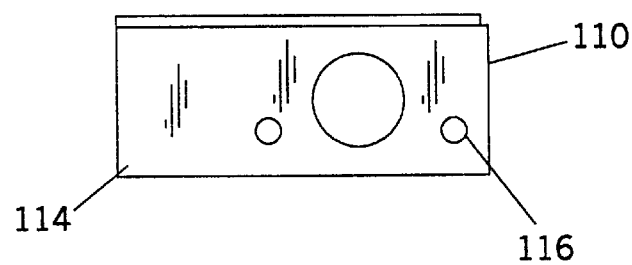
FIG. 5B is a rear elevation view of the angle insert of FIG. 5A.
Figure 5C:
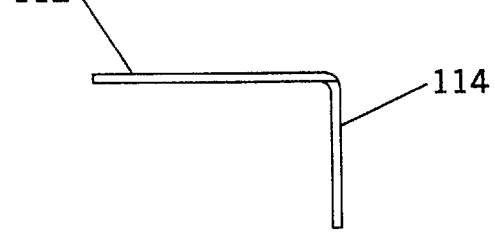
FIG. 5C is a side elevation view of the angle insert of FIG. 5A.
Figure 7:
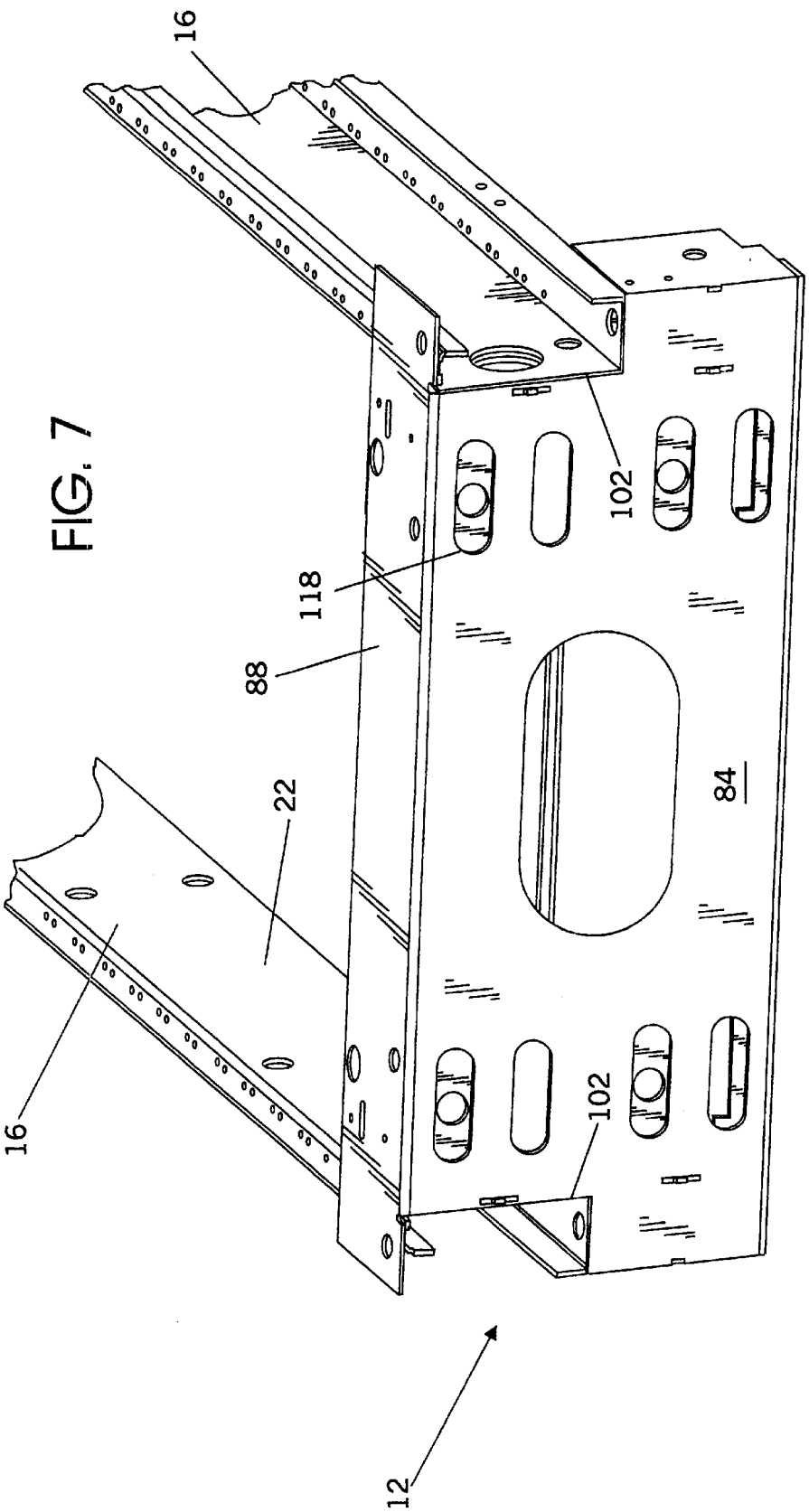
FIG. 7 is a perspective bottom view of the base subassembly of FIG. 6.

In the embodiment shown in FIGS. 6 and 7, the base subassembly, generally designated 12, includes upper and lower base plates 82, 84, respectively, front and rear braces 86, 88, respectively, and gussets 92. Each gusset 92 includes a horizontal portion 94, and inner and outer legs 96, 98 depending downwardly therefrom and disposed in contact with lower base plate 84. Lower base plate 84 includes cut-outs 102 to accommodate insertion of vertical support members 16 adjacent to gussets 92. In order to increase the stability and strength of rack assembly 10, removable angle inserts 110 having horizontal and vertical portions 112, 114 are provided, as shown in detail in FIGS. 5A–5C. Each angle insert 110 is installed in base subassembly 12 such that horizontal portion 112 contacts lower base plate 84 and vertical portion 114 contacts both inner leg 96 of gusset 92 and inside base portion 22 of vertical support member 16. Angle inserts 110 are preferably bolted to base subassembly 12 through holes 116 in angle inserts 110, holes (not shown) in gussets 92 or inside base portions 22, and holes or slots 118 in lower base plate 84. Removably fastened angle inserts 110 may be replaced without replacing entire base subassembly 12, and thus are superior to conventional welded inserts.

It will thus be seen that there is provided, as described hereinbefore, a telecommunications rack which can assume different heights in order to accommodate the specific needs of the user. This is accomplished by providing an extension frame that is structurally designed to permit the rack to maintain compliance with industry requirements for resistance against seismic forces, in a manner not heretofore known. The extension frame also includes a panel which adds stiffness and prevents installation of sensitive equipment therein.

It will be understood that various details of the invention may be changed without departing from the scope of the invention. Furthermore, the foregoing description is for the purpose of illustration only, and not for the purpose of limitation—the invention being defined by the claims.

What is claimed is:

1. A rack assembly for mounting telecommunications equipment and adapted for withstanding seismic forces, comprising:

(a) a main frame subassembly including an upper horizontal support member, a lower horizontal support member, a first vertical support member, and a second vertical support member spaced in parallel relation to the first vertical support member, the upper and lower horizontal support members securely interposed between the first and second vertical support members, and the first and second vertical support members each having a double-bend profile, wherein the double-bend profile is defined by an inside base portion, a first medial leg and a second medial leg each extending substantially orthogonally from the inside base portion, a first distal leg extending substantially orthogonally from the first medial leg in a direction towards the second medial leg, and a second distal leg extending substantially orthogonally from the second medial leg in a direction towards the first medial leg; and (b) an extension frame subassembly including an upper horizontal frame member, a lower horizontal frame member, a first vertical frame member, and a second vertical frame member spaced in parallel relation to the first vertical frame member, wherein the upper and lower horizontal frame members are securely interposed between the first and second vertical frame members, the lower horizontal frame member is securely attached to the upper horizontal support member of the main frame subassembly, and the first and second vertical frame members each have the same double-bend profile corresponding to the first and second vertical support members of the main frame subassembly.

2. The rack assembly according to claim 1 wherein the double-bend profile associated with the first and second vertical support members and the first and second vertical frame members is further defined wherein the first medial leg has a first length greater than a second length of the second medial leg.

3. The rack assembly according to claim 1 wherein the first and second vertical support members and the first and second vertical frame members are constructed from a high-tensile, low-alloy steel having a minimum yield strength of 50,000 psi and a minimum 26% elongation.

4. The rack assembly according to claim 3 wherein the high-tensile, low-alloy steel is adapted from AS-715 steel.

5. A rack assembly for mounting telecommunication equipment and adapted for withstanding seismic forces, comprising:

(a) a base subassembly including a lower base plate having a front edge, a rear edge, a first side edge, a second side edge, a first gusset having a first outer leg extending upwardly from the lower base plate proximate to the first side edge and a first inner leg extending upwardly from the lower base plate at a location spaced inwardly from the first side edge, and a second gusset having a second outer leg extending upwardly from the lower base plate proximate to the second side edge and a second inner leg extending upwardly from the lower base plate at a location spaced inwardly from the second side edge, wherein the first and second gussets are disposed transversely with respect to the front and rear edges;

(b) a first vertical support member mounted to the base subassembly adjacent to the first gusset and including an inside base portion disposed in register with the first inner leg of the first gusset, and a second vertical support member mounted to the base subassembly adjacent to the second gusset and including an inside base portion disposed in register with the second inner leg of the second gusset;

(c) a first angle insert including a horizontal portion disposed on the lower base plate of the base subassembly and a vertical portion disposed adjacent to and in contact with both the first inner leg of the first gusset and the inside base portion of the first vertical support member, and a second angle insert including a horizontal portion disposed on the lower base plate and a vertical portion disposed adjacent to and in contact with both the second inner leg of the second gusset and the inside base of the second vertical support member;

(d) means for removably attaching the first and second angle inserts to the base subassembly without the use of welding;

(e) an upper horizontal support member securely interposed between the first and second vertical support members, wherein the base subassembly, the first and second vertical support members, and the upper horizontal support member cooperatively define a main frame subassembly; and (f) an extension frame subassembly including an upper horizontal frame member, a lower horizontal frame member, a first vertical frame member, and a second vertical frame member spaced in parallel relation to the first vertical frame member, wherein the upper and lower horizontal frame members are securely interposed between the first and second vertical frame members, and the lower horizontal frame member is securely attached to the upper horizontal support member of the main frame subassembly.

6. The rack assembly according to claim 5 wherein the removably attaching means includes a first bolt extending through a hole in the vertical portion of each angle insert and through a corresponding hole in the inside base portion of each vertical support member, and a second bolt extending through a hole in the horizontal portion of each angle insert and through a corresponding hole in the lower base plate of the base subassembly.

7. The rack assembly according to claim 5 wherein the removably attaching means includes a first bolt extending through a hole in the vertical portion of each angle insert and through a corresponding hole in the inner leg of each gusset, and a second bolt extending through a hole in the horizontal portion of each angle insert and through a corresponding hole in the lower base plate of the base subassembly.

8. A rack assembly for mounting telecommunications equipment and adapted for withstanding seismic forces, comprising:

(a) a main frame subassembly including an upper horizontal support member, a lower horizontal support member, a first vertical support member, and a second vertical support member spaced in parallel relation to the first vertical support member, the upper and lower horizontal support members securely interposed between the first and second vertical support members, and the upper horizontal support member having two front corners, two rear corners, and a hole located proximate to each corner;

(b) an extension frame subassembly including an upper horizontal frame member, a lower horizontal frame member, a first vertical frame member, and a second vertical frame member spaced in parallel relation to the first vertical frame member, wherein the upper and lower horizontal frame members are securely interposed between the first and second vertical frame members, and the lower horizontal frame member has two front corners, two rear corners, and a hole located proximate to each corner in alignment with a corresponding one of the holes of the upper horizontal support member of the main frame subassembly; and (c) means for securely attaching the lower horizontal frame member to the upper horizontal support member of the main frame subassembly including a bolt inserted through each corresponding pair of holes of the lower horizontal frame member and the upper horizontal support member and a nut threaded to each bolt.

9. The rack assembly according to claim 8 further comprising a filler panel having a central panel portion vertically disposed within the extension frame subassembly transversely between the two front corners and the two rear corners of the lower horizontal frame member of the extension frame subassembly.

10. An extension subassembly adapted for installation to a main frame subassembly wherein the extension subassembly and the main frame subassembly cooperatively define a rack assembly for mounting telecommunications equipment, and the extension subassembly is adapted for adding strength to the rack assembly against seismic forces and for preventing the installation of telecommunication equipment within the extension subassembly; the main frame subassembly including an upper horizontal support member, a lower horizontal support member, a first vertical support member, and a second vertical support member spaced in parallel relation to the first vertical support member, wherein the upper and lower horizontal support members are securely interposed between the first and second vertical support members; and the extension subassembly comprising:

(a) an upper horizontal frame member, a lower horizontal frame member, a first vertical frame member, and a second vertical frame member spaced in parallel relation to the first vertical frame member, wherein the upper and lower horizontal frame members are securely interposed between the first and second vertical frame members, the lower horizontal frame member is securely attached to the upper horizontal support member of the main frame subassembly, and an open area within the extension subassembly is defined by the upper and lower horizontal frame members and the first and second vertical frame members; and (b) a filler panel securely disposed within the open area and having an upper edge disposed proximate to the upper horizontal frame member, and lower edge disposed proximate to the lower horizontal frame member, a first side edge disposed proximate to the first vertical frame member, and a second side edge disposed proximate to the second vertical frame member.

11. The extension subassembly according to claim 10 wherein the filler panel includes a first side portion extending from the first side edge and contacting the first vertical frame member and a second side portion extending from the second side edge and contacting the second vertical frame member.

12. A method for extending the height of a rack assembly for mounting telecommunications equipment without detrimentally affecting the ability of the rack assembly to withstand seismic forces, comprising the steps of:

(a) providing a main frame subassembly including an upper horizontal support member, a lower horizontal support member, a first vertical support member, and a second vertical support member spaced in parallel relation to the first vertical support member, the upper and lower horizontal support members securely interposed between the first and second vertical support members, wherein the first and second vertical support members are constructed from a high-tensile, low-alloy steel having a minimum yield strength of 50,000 psi and a minimum 26% elongation; and (b) an extension frame subassembly including an upper horizontal frame member, a lower horizontal frame member, a first vertical frame member, and a second vertical frame member spaced in parallel relation to the first vertical frame member, wherein the upper and lower horizontal frame members are securely interposed between the first and second vertical frame members, the lower horizontal frame member is securely attached to the upper horizontal support member of the main frame subassembly, and the first and second vertical frame members are constructed from a high-tensile, low-alloy steel having a minimum yield strength of 50,000 psi and a minimum 26% elongation.

\* \* \* \* \*

(12) EX PARTE REEXAMINATION CERTIFICATE (5142nd)
United States Patent
Reece

(10) Number: US 6,179,133 C1
(45) Certificate Issued: Jul. 12, 2005

(54) SEISMIC RACK WITH EXTENSION SUBASSEMBLY

(75) Inventor: Gil W. Reece, Wake Forest, NC (US)

(73) Assignee: Newton Instrument Company, Inc., Butner, NC (US)

Reexamination Request:
No. 90/006,450, Nov. 13, 2002

Reexamination Certificate for:
Patent No.: 6,179,133
Issued: Jan. 30, 2001
Appl. No.: 09/385,144
Filed: Aug. 30, 1999

(51) Int. Cl.$^7$ .................................................. A47F 5/00
(52) U.S. Cl. ........................ 211/26; 211/189; 211/190; 361/829
(58) Field of Search ........................... 211/26, 189, 175, 211/190, 194; 312/265.1, 265.2, 265.3, 265.4, 265.5, 223.2, 223.1, 223.4, 223.6; 361/829

(56) References Cited

U.S. PATENT DOCUMENTS

| | | | | |
|---|---|---|---|---|
| 3,787,250 | A | * 1/1974 | Korchynsky et al. | 148/12.3 |
| 5,004,107 | A | 4/1991 | Sevier et al. | 211/26 |
| 5,028,357 | A | * 7/1991 | Brado | 52/239 |
| 5,233,129 | A | 8/1993 | Hall | 174/52.1 |
| 5,284,254 | A | 2/1994 | Rinderer | 211/26 |

OTHER PUBLICATIONS

Electromechanical Design Handbook, 3$^{rd}$ edition (1999), p. 4.24.*

Structural Steel Designer's Handbook, 3$^{rd}$ edition (1999), p. 1.12.*

Hendry Telephone Products Catalogue, (Feb. 1997), Relay Racks, pp. 12, 44, 45, 46,56.

Hendry Telephone Products Catalogue, (Jun. 1991), Relay Racks, pp. 8–11, 39, 52, 64.

Hendry Telephone Products Catalogue, (Sep. 1996), Unequal Flange Racks & Accessories, pp. 1–4, 7, 8, 13.

* cited by examiner

*Primary Examiner*—Jennifer E. Novosad

(57) ABSTRACT

A rack assembly for mounting telecommunications equipment and adapted for withstanding seismic forces includes a main frame subassembly including an upper horizontal support member, a lower horizontal support member, a first vertical support member, and a second vertical support member spaced in parallel relation to the first vertical support member. The first and second vertical support members each have a double-bend profile, defined by an inside base portion, a first medial leg and a second medial leg each extending substantially orthogonally from the inside base portion, a first distal leg extending substantially orthogonally from the first medial leg in a direction towards the second medial leg, and a second distal leg extending substantially orthogonally from the second medial leg in a direction towards the first medial leg. An extension frame subassembly is securely attached to the upper horizontal support member of the main frame subassembly. The extension frame subassembly includes vertical frame members having the same double-bend profile as the first and second vertical support members of the main frame subassembly.

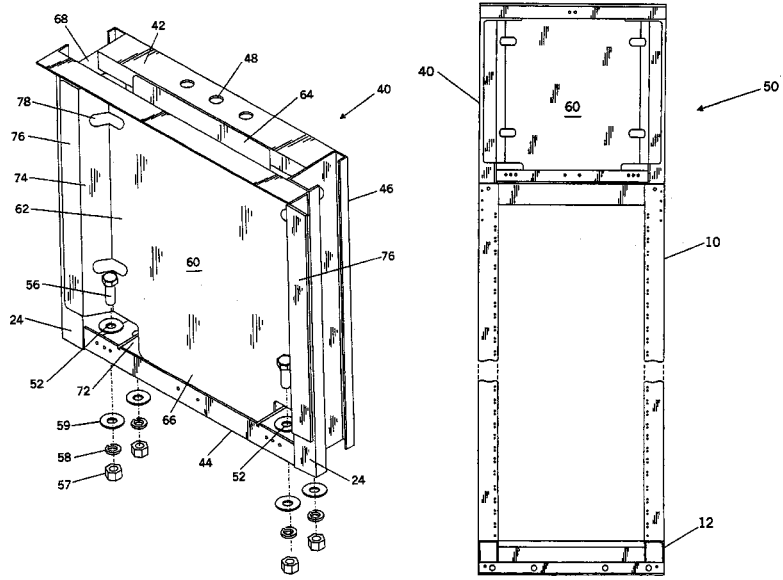

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9 and 11 is confirmed.

Claims 1–8, 10 and 12 are cancelled.

\* \* \* \* \*